(12) United States Patent
Huang et al.

(10) Patent No.: US 8,240,904 B2
(45) Date of Patent: Aug. 14, 2012

(54) LIGHT DIFFRACTION MEMBER AND DISPLAY AND BACKLIGHT MODULE HAVING THE SAME

(75) Inventors: Kuo-Jui Huang, Tai Chung County (TW); Zhi-Ting Ye, Tai Chung County (TW)

(73) Assignee: Wintek Corporation, Taichung (TW)

( * ) Notice: Subject to any disclaimer, the term of this patent is extended or adjusted under 35 U.S.C. 154(b) by 198 days.

(21) Appl. No.: 12/725,892

(22) Filed: Mar. 17, 2010

(65) Prior Publication Data
US 2010/0238685 A1    Sep. 23, 2010

(30) Foreign Application Priority Data
Mar. 18, 2009    (TW) .............................. 98108708 A

(51) Int. Cl.
*F21V 7/04*    (2006.01)
(52) U.S. Cl. ......... 362/607; 362/608; 362/620; 362/626
(58) Field of Classification Search .................. 362/607, 362/608, 609, 620, 626
See application file for complete search history.

(56) References Cited

U.S. PATENT DOCUMENTS

| | | | | |
|---|---|---|---|---|
| 5,887,964 A | * | 3/1999 | Higuchi et al. | 362/620 |
| 7,568,828 B2 | * | 8/2009 | Chen et al. | 362/626 |
| 7,789,538 B2 | * | 9/2010 | Epstein et al. | 362/333 |
| 2003/0086034 A1 | | 5/2003 | Yoon | |
| 2005/0174807 A1 | * | 8/2005 | Yu et al. | 362/626 |

* cited by examiner

*Primary Examiner* — Evan Dzierzynski
(74) *Attorney, Agent, or Firm* — Muncy, Geissler, Olds & Lowe, PLLC

(57) ABSTRACT

A display including a display panel and a backlight module adjacent to the display panel is provided. The backlight module includes a light source emitting a light beam and at least one light diffraction member. The light diffraction member includes a first surface, a second surface, an azimuth convergence structure and a light diffraction structure. The second surface is opposite the first surface, and the light beam enters the light diffraction member through the second surface and leaves the light diffraction member from the first surface. The azimuth convergence structure is disposed on the second surface for converging the azimuth of the light beam incident thereon. The light diffraction structure is disposed on the first surface for adjusting the emergence angle of the light beam.

20 Claims, 7 Drawing Sheets ns, and effects of the invention can be illustrated more
LIGHT DIFFRACTION MEMBER AND DISPLAY AND BACKLIGHT MODULE HAVING THE SAME

BACKGROUND OF THE INVENTION (a) Field of the Invention

The invention relates to a light diffraction member and a display and a backlight module having the light diffraction member.

(b) Description of the Related Art

FIG. 1 shows an explosion diagram illustrating a conventional display 10. Referring to FIG. 1, the display 10 includes a display panel 11 and a backlight module 20. The backlight module 20 includes a back plate 21 and a light guide plate 22, a reflective sheet 23, a light source 24 and an optical film set. The optical film set includes a diffusion plate 25, a first brightness enhancement film 26, and a second brightness enhancement film 27. The diffusion plate 25 is adjacent to the light emitting side of the light guide plate 22. The reflective sheet 23 is adjacent to the button surface of the light guide plate 22. The light source 24 is disposed on the side of the incidence surface of the light guide plate 22. The light guide plate 22 may be a transparent substrate. A light beam emitted by the light source 24 is incident into the light guide plate 22 from the incidence surface thereof, and then leaves the light guide plate 22 from the top surface (light emitting side) before passing through the diffusion plate 25, the first brightness enhancement film 26, and the second brightness enhancement film 27. The brightness enhancement films 26 and 27 are used to control the emergence angle of light so that the light emitted by the light source 24 may be collected in the predetermined range of the viewing angle. As a result, the brightness of the display is increased. The diffusion plate 25 is used to optimize the viewing effect. Further, a stack of three optical films are needed to increase the quality of the conventional display 10 according to the conventional design.

BRIEF SUMMARY OF THE INVENTION

One embodiment of the invention provides a light diffraction member for diffusing a light beam. One embodiment of the invention provides a backlight and a display having the light diffraction member for diffusing a light beam.

According to an embodiment of the invention, a display including a display panel and a backlight module adjacent to the display panel is provided. The backlight module includes a light source emitting a light beam and at least one light diffraction member. The light diffraction member includes a first surface, a second surface, an azimuth convergence structure and a light diffraction structure. The second surface is opposite the first surface, and the light beam enters the light diffraction member through the second surface and leaves the light diffraction member from the first surface. The azimuth convergence structure is disposed on the second surface for converging the azimuth angle of the light beam incident thereon. The light diffraction structure is disposed on the first surface for adjusting the emergence angle of the light beam.

According to an embodiment of the invention, a backlight module is provided. The backlight module includes a light source emitting a light beam and at least one light diffraction member. The light diffraction member includes a first surface, a second surface, an azimuth convergence structure and a light diffraction structure. The second surface is opposite the first surface, and the light beam enters the light diffraction member through the second surface and leaves the light diffraction member from the first surface. The azimuth convergence structure is disposed on the second surface for converging the azimuth angle of the light beam incident thereon. The light diffraction structure is disposed on the first surface for adjusting the emergence angle of the light beam.

According to an embodiment of the invention, a light diffraction member for diffusing a light beam is provided. The light diffraction member includes a first surface, a second surface, an azimuth convergence structure and a light diffraction structure. The second surface is opposite the first surface, and the light beam enters the light diffraction member from the second surface and leaves the light diffraction member from the first surface. The azimuth convergence structure is disposed on the second surface for converging the azimuth angle of the light beam incident thereon. The light diffraction structure is disposed on the first surface for adjusting the emergence angle of the light beam.

Compared with the conventional design, a light diffraction member is used to diffuse a light beam according to an embodiment of the present invention. The light diffraction member applies the principle of light diffraction to achieve light diffusion effect and to increase the light transmission efficiency as a result.

Other purposes and benefits of the invention can be further understood by the technical features disclosed in the above-mentioned embodiments. In order to provide better and more obvious understanding of the purposes, features, and benefits of the invention, the detailed descriptions of the embodiments according to the invention will be given in the following together with figures.

DETAILED DESCRIPTION OF THE INVENTION

The above mentioned and other technical contents, uniqueness, and effects of the invention can be illustrated more clearly by the following detailed descriptions together with the corresponding figures. The wording describing directions used in the following descriptions, such as: up, down, left, right, front, back or the like, indicates the directions with respect to the figure only. Therefore, the wording used to describe directions is for illustration but not to limit the scope of the invention.

Figure 1:
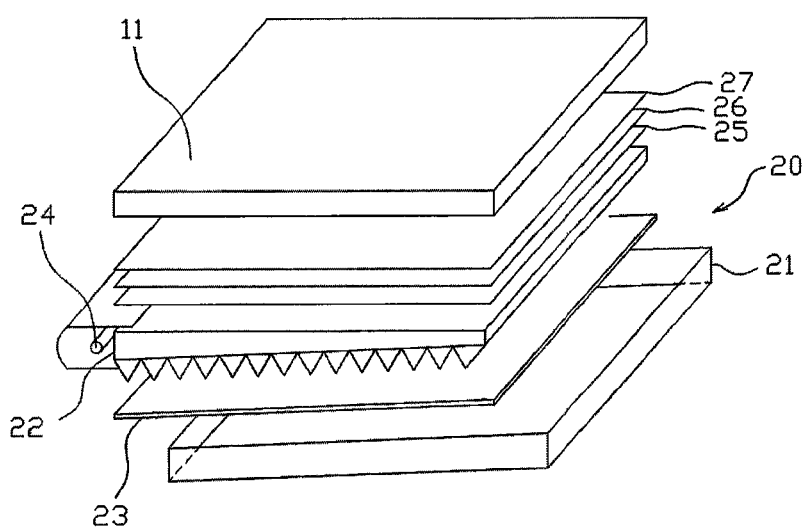
FIG. 1 shows an explosion diagram illustrating a conventional display.
Figure 2:
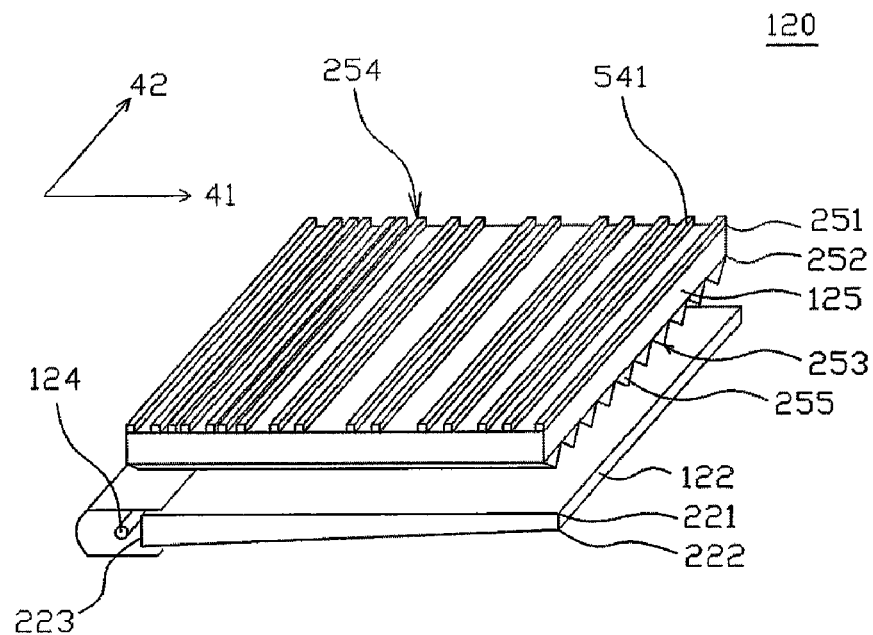
FIG. 2 shows an explosion diagram illustrating the backlight module according to an embodiment of the invention.

FIG. 2 shows an explosion diagram illustrating the backlight module according to an embodiment of the invention. As shown in FIG. 2, a backlight module 200 includes a light guide plate 122, a light source 124 and at least one light diffraction member 125. The light guide plate 122 includes a light emitting surface 221, a reflection surface 222 opposite the light emitting surface 221 and a light incidence surface 223 connected between the light emitting surface 221 and the reflection surface 222. The light diffraction member 125 includes a first surface 251, a second surface 252 opposite the first surface 251, a light diffraction structure 254 disposed on the first surface 251, and an azimuthal angle convergence structure 253 disposed on the second surface 252. The light source 124 adjacent to the light incidence surface 223 is adapted for emitting a light beam. The light beam from the light source 124 passing through the light incidence surface 223 is directed by the light guide plate 122 to travel along the first direction 41, to emerge from the light emitting surface 221, and then to reach the light diffraction member 125. The second surface 252 of the light diffraction member 125 is adjacent to the light emitting surface 221 of the light guide plate 122. The light beam incident to the second surface 252 of the light diffraction member 125 enters the light diffraction member 125, and the azimuthal angle of the light beam is converged by the azimuthal angle convergence structure 253. Then, the light beam is incident to the first surface 251 of the light diffraction member 125, diffracted in the light diffraction structure 254, and then goes out of the light diffraction member 125. In this embodiment, the light diffraction member 125 may be a holographic pattern or a holographic diffusion sheet that has high light-transmittance to increase the brightness of the backlight module 120.

Figure 3:
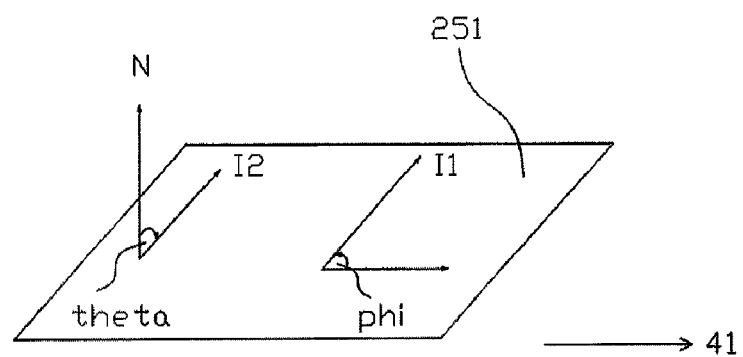
FIG. 3 shows a schematic diagram illustrating the azimuthal angle and emergence angle of light on a surface according to an embodiment of the invention.
Figure 4:
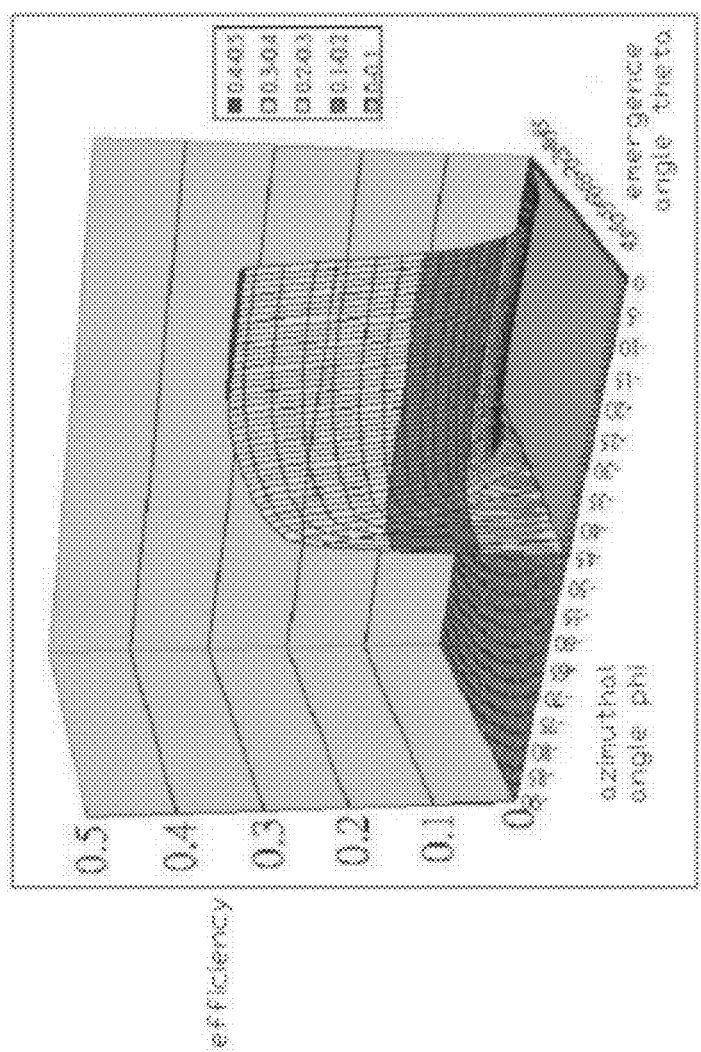
FIG. 4 shows a simulation diagram illustrating the relationship between the azimuthal angle and emergence angle of light and the diffraction efficiency according to an embodiment of the invention.

FIG. 3 shows a schematic diagram illustrating the azimuthal angle and the emergence angle of light on a surface according to an embodiment of the invention. The first surface 251 of the light diffraction member 125 is described to exemplify this embodiment. As shown in FIG. 3, the azimuthal angle phi indicates the angle between a light beam I1 and the first direction 41, and the emergence angle theta indicates the angle between a light beam I2 and the normal direction N of the first surface 251. FIG. 4 shows a simulation diagram illustrating the relationship between the azimuthal angle and emergence angle of light and the diffraction efficiency according to an embodiment of the invention. The simulation diagram shown in FIG. 4 is obtained from computer's calculation. As shown in FIG. 4, the curve obtained at the emergence angle theta of light between about 47 degrees and about 90 degrees is omitted since it is symmetrical to the one obtained at the emergence angle theta of light between about 0 degree and about 46 degrees. When the emergence angle theta of light is between about 47 degrees and about 90 degrees, the light beam has preferred diffraction efficiency at the azimuthal angle in the range of about 0 degree to about 47 degrees. Further, the smaller the azimuthal angle phi is, the higher the diffraction efficiency of the light diffraction member 125 is obtained. When the emergence angle of light is larger than about 47 degrees, the diffraction efficiency appears extremely low. Accordingly, the light diffraction member 125 according to this embodiment has an azimuthal angle convergence structure 253 on the second surface 252, and its light diffusion efficiency is increased since the azimuthal angle convergence structure 253 may converge the azimuthal angle phi of the light beam incident to the light diffraction member 125. Preferably, the azimuthal angle convergence structure 253 is shaped to allow the azimuthal angle phi to be converged in the range of about 0 degree to about 47 degrees.

Figure 5:
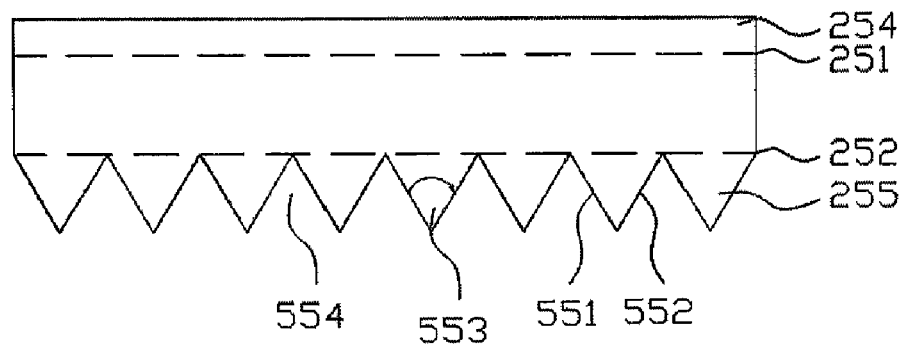
FIG. 5 shows a cross-section of a light diffraction member along a second direction according to an embodiment of the invention.

The azimuthal angle convergence structure 253 may made of any structure capable of refracting or reflecting a light beam, and its shape may be a pyramid, a spheroid, a spheroid column, a hemisphere and a hemisphere column. In this embodiment, the azimuthal angle convergence structure 253 includes a plurality of columnar structures 255 that are connected with or spaced apart from each other. In order to obtain a better convergence effect, the longitudinal direction of columnar structures 255 is parallel to the first direction 41. FIG. 5 shows a cross-section of a light diffraction member 125 along a second direction 42 according to an embodiment of the invention. As shown in FIG. 5, the columnar structures 255 protrude from the second surface 252 of the light diffraction member 125 and have a first side surface 551 and a second side surface 552. One side edge of the first side surface 551 and one side edge of a second side surfaces 552 are connected with each other to form a vertex angle 553. Another side edge of the first side surface 551 and another side edge of a second side surfaces 552 are both connected to the second surface 252 of the light diffraction member 125. The first and second side surfaces 551 and 552 are capable of converging the azimuthal angle of the light beam. Preferably, the surfaces 551 and 552 are plane surfaces so that the columnar structure 255 is in the shape of a triangular prism, and a V-cut structure 554 is formed between two columnar structures 255. The vertex angle 553 may be in the range of about 30 degrees and about 150 degrees. It is preferred that the vertex angle 553 is in the range of about 45 degrees to about 90 degrees to have a better convergence effect. In a simulation experiment, the azimuthal angle phi is converged to be in the range of about 0 degree and about 45 degrees when the vertex angle 553 is about 54 degrees.

Figure 6:
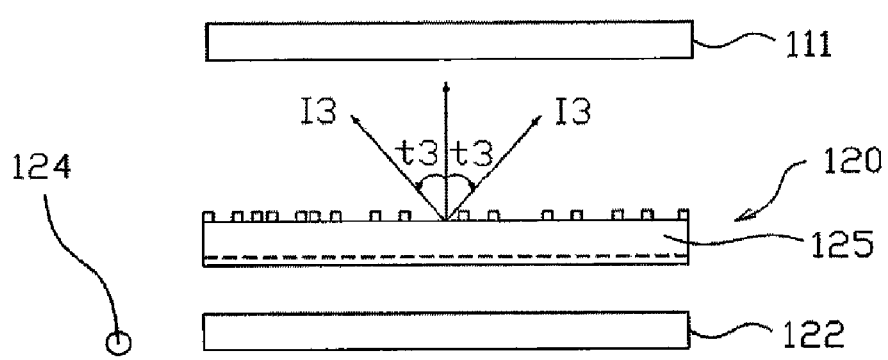
FIG. 6 shows a cross-section of a display along a first direction according to an embodiment of the invention.

The light diffraction structure 254 is made of a plurality of a lengthwise structures 541. The person having ordinary skill in the art can design the width and depth of the interval between two adjacent lengthwise structures 541 to achieve the light diffraction effect. The shape of the lengthwise structures 541 is not limited in the invention, if it is substantially extend along a longitudinal direction L. The lengthwise structure 541 may have a straight line shape, as shown in FIG. 2; in another embodiment, it may have a wave-like shape (not shown). In this embodiment, the longitudinal direction of the lengthwise structures 541 is substantially perpendicular to the first direction 41 to have a preferred diffusion effect. In addition, the light diffraction structure 254 can diffract the light beam to achieve diffusion effect, and also it can adjust the emergence angle theta of the light beam that is diffracted and emerges from the light diffraction member 125, if the light diffraction structure 254 is appropriately designed. FIG. 6 shows a cross-section of a display 110 along a first direction 41 according to an embodiment of the invention. As shown in FIG. 6, the display 110 includes a display panel 111 and a backlight module 120 in FIG. 2. In this embodiment, the emergence angle t3 of the light beam I3 is between about 0 degree and about 65 degrees. In order to get preferred front display brightness, the light diffraction structure 254 is appropriately designed so that the emergence angle of the light beam I3 passing through the light diffraction structure 254 is between about 0 degree and about 20 degrees, preferably between about 0 degree and about 10 degrees.

Figure 7:
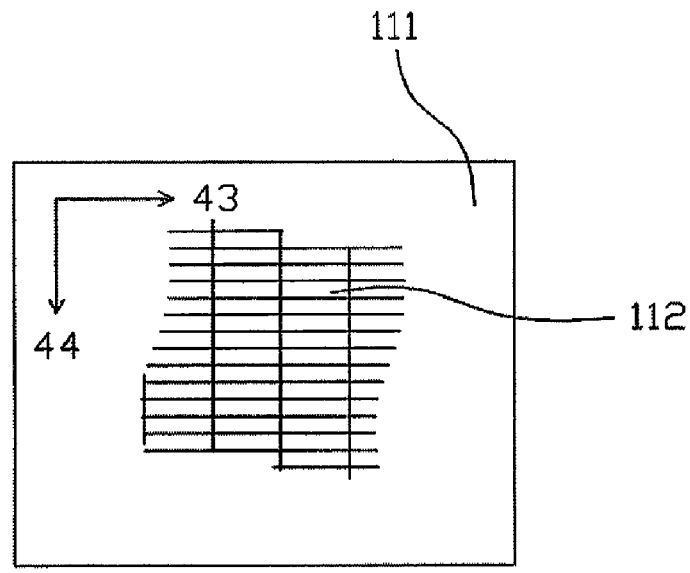
FIG. 7 shows a plan view of a display panel according to an embodiment of the invention.
Figure 8:
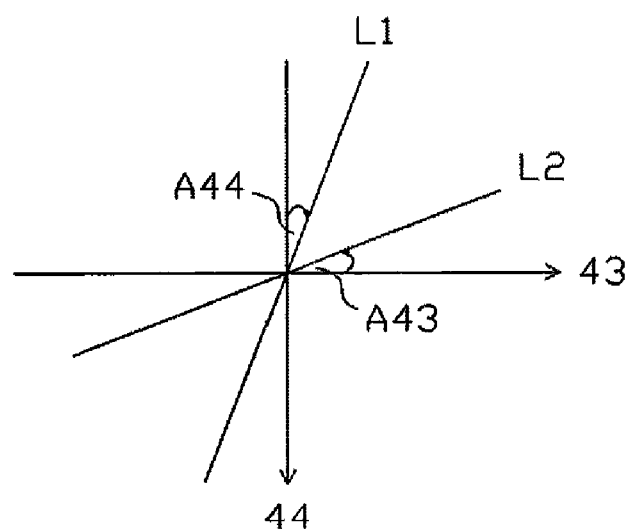
FIG. 8 shows a schematic diagram illustrating the relative position between a display panel of display in FIG. 6 and a light diffraction member.

FIG. 7 shows a plan view of a display panel 111 according to an embodiment of the invention. The display panel 111 includes a plurality of pixel structures 112. The pixel structures 112 are arranged as a matrix along a third direction 43 and a fourth direction 44 perpendicular to the third direction 43. FIG. 8 shows a schematic diagram illustrating the relative position between a display panel 111 of display 110 in FIG. 6 and a light diffraction member 125. Since the display panel 111 and the light diffraction member 125 have regularly-arranged structures, such as the pixel structure 112 and the azimuthal angle convergence structure 253, the moiré problem occurs when the display panel 111 and the light diffraction member 125 are overlapped with each other. Accordingly, it is preferred that the regularly-arranged structures of the display panel 111 and the light diffraction member 125 are staggered to avoid the moiré problem. Specifically, the included angle A44 between the longitudinal direction L1 of columnar structures 255 of a light diffraction member 125 and the fourth direction 44 of the display panel 111 is between about 0 degree and about 45 degrees, preferably between about 0 degree and about 20 degrees. According to another embodiment, the included angle A43 between the longitudinal direction L2 of columnar structures 255 of a light diffraction member 125 and the third direction 43 of the display panel 111 is between about 0 degree and about 45 degrees, preferably between about 0 degree and about 20 degrees.

Figure 9:
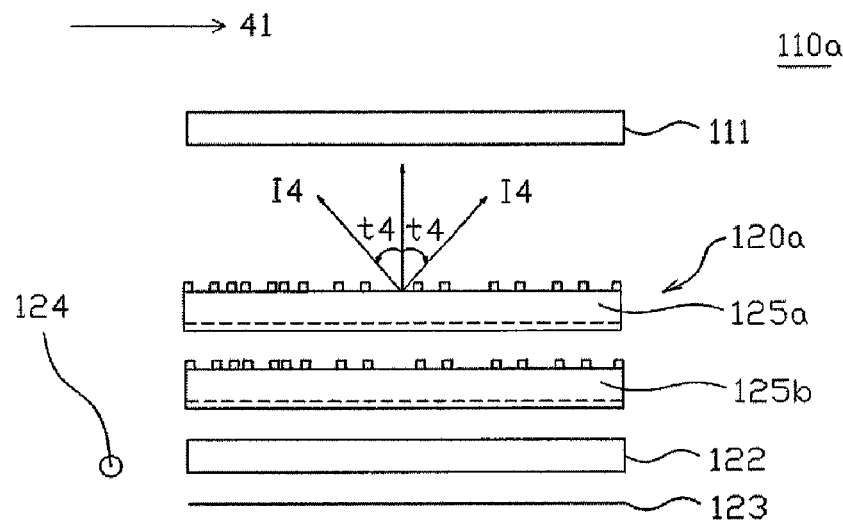
FIG. 9 shows a cross-section of a display along a first direction according to another embodiment of the invention.
Figure 10:
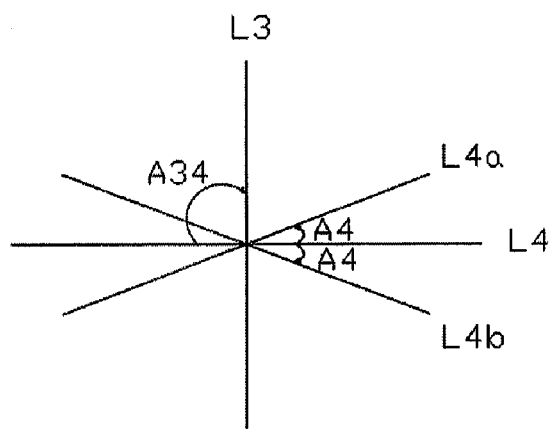
FIG. 10 shows a schematic diagram illustrating the included angle relationship between the longitudinal directions of columnar structures of the first and second light diffraction member in FIG. 9.

FIG. 9 shows a cross-section of a display 110a along a first direction according to another embodiment of the invention. As shown in FIG. 9, the display 110a includes a display panel 111 and a backlight module 120a. The structure of the backlight module 120a is similar to that of the backlight module in FIGS. 2 and 6, and therefore the same numerical reference designates the same member in these apparatus and the descriptions of the same members will be omitted. Only the difference between these apparatus will be described in the following. The backlight module 120a further includes a first light diffraction member 125a, a second light diffraction member 125b, and a reflective sheet 123. The light diffraction members are similar to the light diffraction member 125 in FIGS. 2 and 6, and therefore their detailed descriptions are omitted. The first and second light diffraction members 125a and 125b is disposed between display panel 111 and the light guide plate 122. The first light diffraction member 125a is adjacent to the display panel 111; the second light diffraction member 125b is adjacent to the light guide plate 122. The light guide plate 122 is disposed between the reflective sheet 123 and the second light diffraction member 125b. In this embodiment, if the light diffraction structures of the first and second light diffraction members 125a and 125b are appropriately designed, the emergence angle of the light beam I4 after passing through the first and second light diffraction members 125a and 125b may be between about 0 degree and about 65 degrees. In order to get preferred front display brightness, the emergence angle of the light beam I4 is between about 0 degree and about 20 degrees, preferably between about 0 degree and about 10 degrees. Compared with the backlight module 120, the backlight module 120a according to this embodiment may get preferred diffusion effect since the light beam I4 passes through two light diffraction members. FIG. 10 shows a schematic diagram illustrating the relative position between the first and second light diffraction members 125a and 125b of display 110a in FIG. 9. In order to have preferred diffusion effect, the included angle A34 between the longitudinal directions L3 and L4 of columnar structures 255 of the first and second light diffraction members 125a and 125b is set to be about 90 degrees. The first and second light diffraction members 125a and 125b have a regularly-arranged structure, such as the azimuthal angle convergence structure 253, the moiré problem occurs when the first and second light diffraction members 125a and 125b are overlapped to each other. Accordingly, it is preferred that the regularly-arranged structures of the first and second light diffraction members 125a and 125b are staggered to improve the moiré problem. Specifically, the included angle A34 between the longitudinal directions L3 and L4 of columnar structures 255 of the first and second light diffraction members 125a and 125b is between about (90−A4) degrees and about (90+A4) degrees.

When the included angle between the longitudinal directions L3 and L4a of columnar structures 255 of the first and second light diffraction members 125a and 125b is smaller than about (90−A4) and A4 is about 20 degrees, the display brightness of the backlight module 120a is significantly decreased. When the included angle between the longitudinal directions L3 and L4b of columnar structures 255 of the first and second light diffraction members 125a and 125b is larger than about (90+A4) and A4 is about 20 degrees, the display brightness of the backlight module 120a is significantly decreased. In an embodiment, it is preferred that the included angle A34 between the longitudinal directions L3 and L4 of columnar structures 255 of the first and second light diffraction members 125a and 125b is between about (90−A4) and (90+A4) and A4 is about 20 degrees, that is, the included angle A34 is between about 70 degrees and about 110 degrees.

Figure 11:
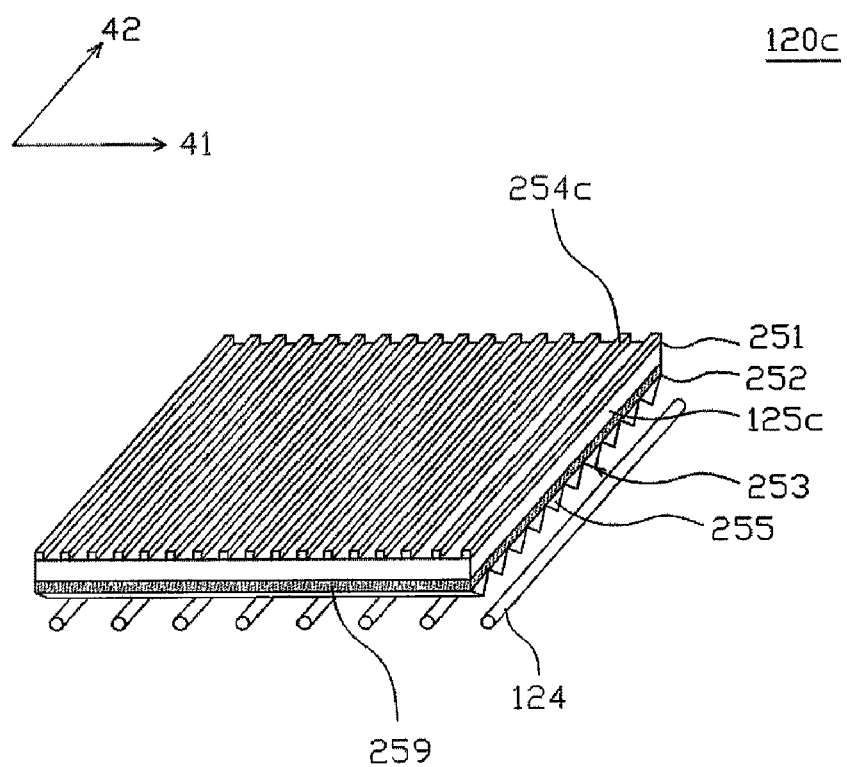
FIG. 11 shows an explosion diagram illustrating the backlight module according to an embodiment of the invention.

FIG. 11 shows an explosion diagram illustrating the backlight module according to an embodiment of the invention. As shown in FIG. 11, a backlight module 200c includes a light source 124 and at least one light diffraction member 125c. The structure of the backlight module 125c is similar to that of the backlight module 125 in FIG. 2, and therefore the same numerical reference designates the same member in these apparatus and the descriptions of the same members will be omitted. Only the difference between these apparatus will be described in the followings. The light diffraction member 125c includes a first surface 251, a second surface 252 opposite the first surface 251, a light diffraction structure 254c disposed on the first surface 251, and an azimuthal angle convergence structure 253 disposed on the second surface 252. The light source 124 adjacent to the second surface 252 is adapted for emitting a light beam. The light beam incident to the second surface 252 of the light diffraction member 125c enters the light diffraction member 125c after its azimuthal angle is converged by the azimuthal angle convergence structure 253, and then travels to the first surface 251 of the light diffraction member 125c, emits out of the light diffraction member 125c after being diffracted in the light diffraction structure 254c. In addition, in one embodiment, the light diffraction member 125c may include a diffusion layer 259 disposed between the first surface 251 and the second surface 252 and being for increasing the diffusion effect of the light diffraction member 125c.

The light diffraction structure of the light diffraction member is not limited according to this invention, and the light diffraction structures 254 and 254c may be any structure in which a light beam is diffracted. In one embodiment, the light diffraction structure may be for example a holographic pattern. In another embodiment, the light diffraction structure may be a sub-wave-length structure or a light grating which is made of a plurality of regularly-arranged columnar structures. In addition, the light diffraction structures 254 and 254c shown in FIGS. 2 and 11 may be the lengthwise structures having a straight-line shape. However, the invention is not limited to this structure. In another embodiment, the light diffraction structures 254 and 254c may be the lengthwise structures (not shown) having a wave-like shape which extends substantially along a longitudinal direction.

A conventional diffusion sheet may be a transparent substrate in which bubbles are formed and reflecting particles is mixed so that it achieves light-scattering effect. However, the conventional diffusion sheet does not have function of converging viewing angle. The light diffraction member according to this embodiment has a diffusion layer. A light diffraction structure is disposed on one side of the diffusion layer so that the emergence angle of light is controlled to achieve the function of converging viewing angle. An azimuthal angle convergence structure is disposed on the other side of the diffusion layer to converge the azimuthal angle of the light beam incident to the light diffraction member, so that the diffraction efficiency is increased. In addition, the light diffraction structure may be appropriately designed such that the emergence angle of the light beam passing through the light diffraction structure is adjusted into a predetermined range. As a result, the brightness of the backlight module is increased and the light diffraction structure achieves the same function that two brightness enhancement films achieve. Hence, the light diffraction structure according to an embodiment of the invention is used instead of a conventional optical film set that includes a diffusion plate, a first brightness enhancement film, and a second brightness enhancement film to considerably reduce fabrication costs.

Although the preferred embodiments of the present invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the present invention is to be encompassed by the claims of the present invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A display comprising:
    a display panel;
    a backlight module adjacent to the display panel, the backlight module comprising:
        a light source for emitting a light beam; and
        at least one light diffraction member comprising:
            a first surface;
            a second surface opposite the first surface, wherein the light beam enters the light diffraction member through the second surface and leaves the light diffraction member from the first surface;
            an azimuthal angle convergence structure disposed on the second surface for converging an azimuthal angle of the light beam incident thereon; and
            a light diffraction structure disposed on the first surface for diffracting the light beam that leaves the light diffraction member from the first surface and adjusting the emergence angle of the light beam.

2. The display according to claim 1, wherein the azimuthal angle convergence structure allows the azimuthal angle of the light beam from the first surface to be converged into the range of 0 degree to 47 degrees.

3. The display according to claim 1, wherein the backlight module further comprises a light guide plate comprising a light incidence surface and a light emitting surface connected to the light incidence surface, wherein the light beam from the light source enters the light guide plate from the light incidence surface and is directed to travel along the first direction, to emerge from the light emitting surface, and to reach the light diffraction member.

4. The display according to claim 3, wherein the azimuthal angle convergence structure comprises a plurality of columnar structures, and the longitudinal direction of each columnar structure is substantially parallel to the first direction.

5. The display according to claim 4, wherein the light diffraction structure comprises a plurality of lengthwise structures, and the longitudinal direction of each lengthwise structure is substantially perpendicular to the first direction.

6. The display according to claim 4, wherein each columnar structure protrudes from the second surface of the light diffraction member and has a first side surface and a second side surface, one side edge of the first side surface and one side edge of the second side surface are connected with each other to form a vertex angle, and another side edge of the first side surface and another side edge of the second side surface are connected to the second surface of the light diffraction member.

7. The display according to claim 6, wherein the columnar structures of the azimuthal angle convergence structure are connected with or spaced apart from each other, and the vertex angle is between 30 degrees and 150 degrees.

8. The display according to claim 6, wherein the columnar structures of the azimuthal angle convergence structure are connected with or spaced apart from each other, and the vertex angle is between 45 degrees and 90 degrees.

9. The display according to claim 4, wherein the light diffraction member comprises a first and a second light diffraction members, and the included angle between the longitudinal direction of the columnar structures of the first light diffraction member and the longitudinal direction of the columnar structures of the second light diffraction members is between 70 degrees and 110 degrees.

10. The display according to claim 9, wherein the emergence angle of the light beam passing through the light diffraction structures of the first and second light diffraction members is in the range of 0 degree to 65 degrees.

11. The display according to claim 1, wherein the display panel comprises a plurality of pixel structures, the pixel structures are arranged as a matrix along a third direction and a fourth direction perpendicular to the third direction, and the included angle between the longitudinal direction of the columnar structures of the light diffraction member and the third or fourth directions of the display panel is between 0 degree and 20 degrees.

12. A backlight module comprising:
    a light source for emitting a light beam; and
    at least one light diffraction member comprising:
        a first surface;
        a second surface opposite the first surface, wherein the light beam enters the light diffraction member through the second surface and leaves the light diffraction member from the first surface;
        an azimuthal angle convergence structure disposed on the second surface for converging an azimuthal angle of the light beam incident thereon; and
        a light diffraction structure disposed on the first surface for diffracting the light beam that leaves the light diffraction member from the first surface and adjusting the emergence angle of the light beam.

13. The backlight module according to claim 12, wherein the azimuthal angle convergence structure allows the azimuthal angle of the light beam from the first surface to be converged into the range of 0 degree to 47 degrees.

14. A light diffraction member adapted for diffusing a light beam comprising:
- a first surface;
- a second surface opposite the first surface, wherein the light beam enters the light diffraction member through the second surface and leaves the light diffraction member from the first surface;
- an azimuthal angle convergence structure disposed on the second surface for converging an azimuthal angle of the light beam incident thereon; and
- a light diffraction structure disposed on the first surface for diffracting the light beam that leaves the light diffraction member from the first surface and adjusting the emergence angle of the light beam.

15. The light diffraction member according to claim 14, wherein the azimuthal angle convergence structure allows the azimuthal angle of the light beam from the first surface to be converged into the range of 0 degree to 47 degrees.

16. The light diffraction member according to claim 14, wherein the azimuthal angle convergence structure comprises a plurality of columnar structures, and the longitudinal direction of each columnar structure is substantially parallel to the first direction.

17. The light diffraction member according to claim 16, wherein the light diffraction structure comprises a plurality of lengthwise structures, and the longitudinal direction of each lengthwise structure is substantially perpendicular to the first direction.

18. The light diffraction member according to claim 17, wherein
- each columnar structure protrudes from the second surface of the light diffraction member and has a first side surface and a second side surface, one side edge of the first side surface and one side edge of the second side surface are connected with each other to form a vertex angle, and another side edge of the first side surface and another side edge of the second side surface are connected to the second surface of the light diffraction member.

19. The light diffraction member according to claim 18, wherein the columnar structures of the azimuthal angle convergence structure are connected with or spaced apart from each other, and the vertex angle is between 30 degrees and 150 degrees.

20. The light diffraction member according to claim 18, wherein the columnar structures of the azimuthal angle convergence structure are connected with or spaced apart from each other, and the vertex angle is between 45 degrees and 90 degrees.

* * * * *